United States Patent [19]

Tomita

[11] Patent Number: 4,853,916
[45] Date of Patent: Aug. 1, 1989

[54] DISC PLAYER FOR PLAYING DISC CONTAINED IN CARTRIDE

[75] Inventor: Toshihiko Tomita, Tokorozawa, Japan

[73] Assignee: Pioneer Electronic Corporation, Tokyo, Japan

[21] Appl. No.: 184,011

[22] Filed: Apr. 20, 1988

[30] Foreign Application Priority Data

Jun. 15, 1987 [JP] Japan ............................. 62-91567[U]

[51] Int. Cl.⁴ .......................... G11B 5/48; G11B 17/00
[52] U.S. Cl. .................................. 369/36; 360/98.06; 360/99.07
[58] Field of Search ................... 369/34, 36, 38, 98.04, 369/98.06, 99.02, 99.03, 99.06, 99.07

[56] References Cited

U.S. PATENT DOCUMENTS 4,504,936 3/1985 Fabet et al. ............................. 369/34
4,608,679 8/1986 Rudy et al. ............................ 369/36

*Primary Examiner*—Steven L. Stephan
*Attorney, Agent, or Firm*—Fleit, Jacobson, Cohn, Price, Holman & Stern

[57] ABSTRACT

A cartridge disc player for consecutively playing a plurality of cartridge discs arranged in order in a holder. The cartridge disc player comprises a playback means for playing a cartridge disc loaded thereon, and cartridge transfer means for drawing a selected one of the cartridges from the holder and conveying and loading the selected cartridge to the playback means. The cartridge transfer means includes a base carrier movable along the holder in a direction in which the cartridges are arranged in order; base carrier positioning means for positioning the base carrier at a positions corresponding to selected one of the cartridges and to the playback means; a movable chasis movably mounted on the base carrier; a catch arm assembly including at least one pair of catch arms swingably mounted on the movable chasis in opposite directions to each other between a pinch position in which said catch arms are close to each other to pinch the selected cartridge and a release position in which the catch arms are remote from each other, and suppress means for suppressing the movement of the catch arms; and movable chasis drive means for driving the movable chasis with respect to the base carrier by urging the catch arm assembly but not the movable chasis per se.

13 Claims, 8 Drawing Sheets

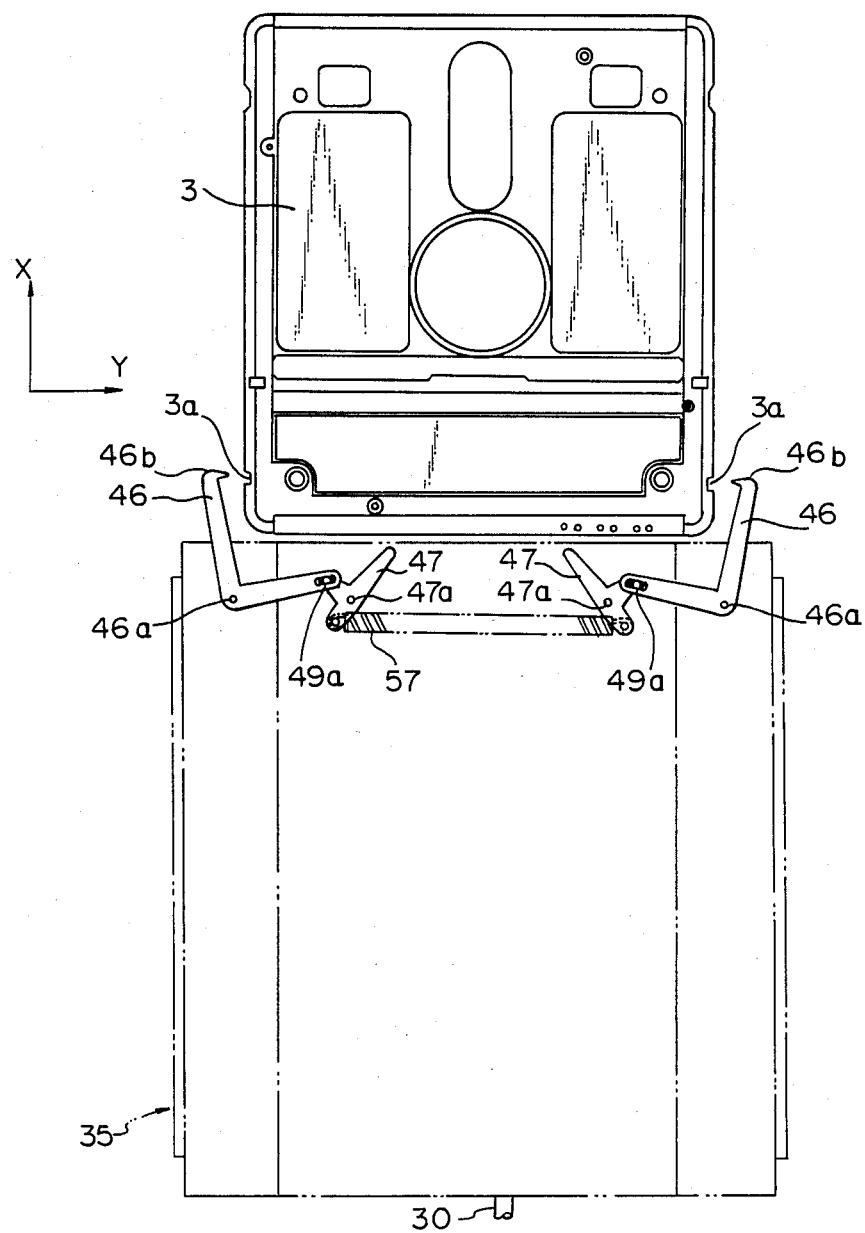

DISC PLAYER FOR PLAYING DISC CONTAINED IN CARTRIDE

BACKGROUND OF THE INVENTION

1. Field of the Invention

The present invention relates to a disc player for consecutively playing a disc contained in a cartridge.

2. Description of Background Art

A disc player for playing a disc contained in a protective flat cartridge was recently developed which plays the disc while keeping the disc within the cartridge. The cartridge is provided with an access aperture through which the disc is read while being rotated within the cartridge. One type of such disc player is arranged to hold a plurality of cartridges each containing a disc and consecutively playing the discs. Such type of the disc player essentially comprises: a store part holding a plurality of cartiridges arranged in order along one direction; playback meand having a turntable, a pick-up, etc. for playing the disc held within the cartridge; and cartridge transfer means for drawing a selected cartridge from the store part and transferring it to a play position within the playback means. The particular transfer means essentially includes a base movable along the direction in which the cartridges are arranged in order, base transfer means for transferring the base, a movable chassis mounted on the base movably along a direction perpendicular to the direction in which the cartridges are arranged in order, chassis drive means for driving the movable chassis to move on the base, at least two catch arms for catching the selected cartridge, and arm drive means for driving the catch arms. The chassis transfer means delivers the movable chassis to such a position that the catch arms are positioned at a place corresponding to a desired cartridge. Then the movable chassis moves with respect to the base so that the catch arms are placed to a state in which the catch arms can grasp or pinch the cartridge. Upon completion of the catching operation of the catch arms, the base transfer means transfers the base to a porduction close to the playback means and then the cartridge is loaded on the playback means.

It has been desired to provide such a complicated cartrige disc player at a low cost.

SUMMARY OF THE INVENTION

It is therefore a primary object of the present invention to provide a cartridge disc player for keeping therein a plurality of cartridge discs and for playing selected one or more of the cartridge discs, which player is economical.

It is another object of the present invention to provide a cartridge disc player for keeping therein a plurality of cartridge discs and for playing selected one or more of the cartridge discs, which player can avoid incorrect arrangment of the cartridge in the store part.

It is a further object of the present invention to provide a cartridge disc player for playing selected one or more cartridge discs taken from the store part thereof which can quickly change the disc being played.

According to the present invention, there is provided cartridge disc player which comprises: a base carrier movable in a first direction in which a plurality of cartridges each containing therein a disc and having an access aperture through which the disc is read by a pickup are arranged in order in a store part; a movable chassis so mounted on the base carrier as to be movable in a second direction perpendicular to the first direction between a catching position close to the store part and a home position remote from the store part; a catch arm assembly including at least one pair of catch arms swingably mounted on the movable chassis in opposite directions to each other between a pinch position in which the arms are close to each other to pinch a selected cartridge and a release position in which the arms are remote from each other, and suppress means for suppressing the movement of the catch arms; and movable chassis drive means for driving the movable chassis with respect to the base by urging the catch arm assembly in the second direction.

BRIEF DESCRIPTION OF THE DRAWINGS

FIGS. 8 and 9 are play views of the cartridge transfer mechanism in two different states.

DETAILED DESCRIPTION OF A PREFERRED EMBODIMENT

A disc contained within a cartridge (referred to as merely "cartridge disc" hereinbelow) may be a recording disc of any type. For example, the cartridge disc may be a so-called DRAW disc having a recording layer made of a magneto-optical material, an organic material such as a cyanine dye.

Figure 1:
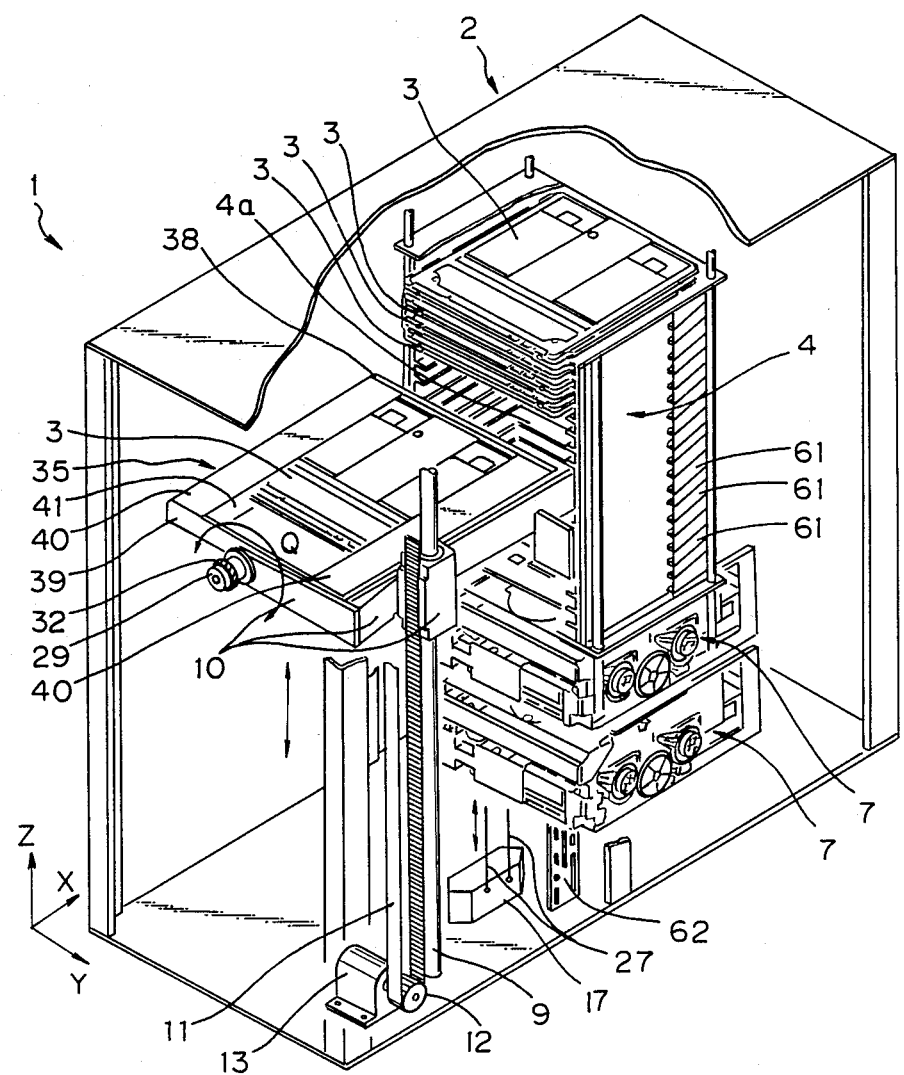
FIG. 1 is a perspective view of a cartridge disc player according to the present invention which is housed in a housing.

In FIG. 1, there is shown a cartridge disc player 1 according to the present invention which is housed within a housing 2 of a rectangular parallelepiped shape. The cartridge disc player 1 comprises a plurality of cartridges 3 arranged in order at a predetermined pitch in a holder 4 in a direction Z which may be the upper and lower direction of the player.

Figure 2:
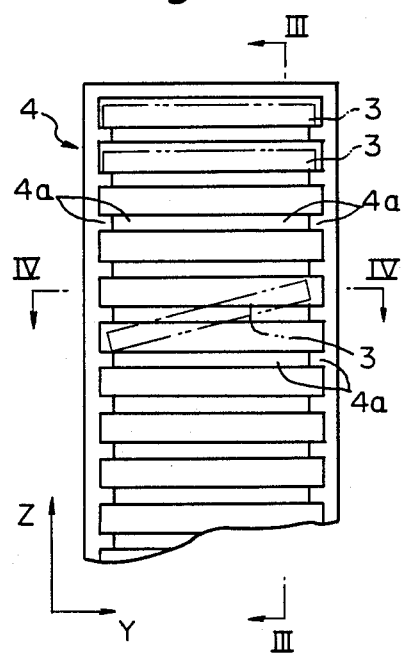
FIG. 2 is a front view of a holder for holding therein a plurality of cartridges which is a part of the cartridge disc player of FIG. 1.
Figure 3:
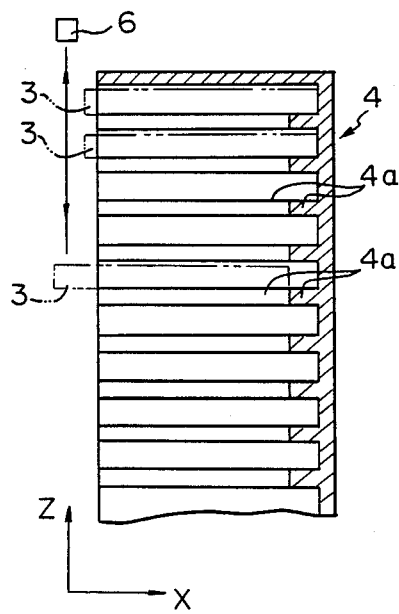
FIGS. 3 and 4 are sectional views of the holder shown in FIG. 2 taken along lines III—III and IV—IV.
Figure 4:
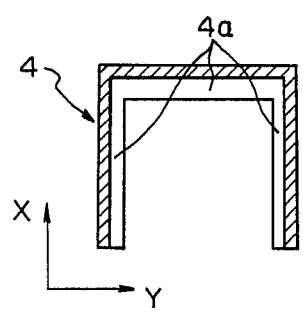

As seen from FIGS. 2 through 4, the holder 4 is formed by a generally rectangular parallelepiped hollow member and opened at one surface thereof. On the three vertical inner walls are formed a plurality of shelves each having a horizontal holding surface defined by projections 4a inwardly projecting from the inner walls and extending throughout the inner walls along a horizontal plane. The projection 4a has sufficiently large dimensions in the horizontal direction so that such erroneous insertion of the cartridge as shown in phantom lines in FIG. 2 can be prevented. A photoemissive and receptive element 6 is provided above the holder 4 in order to detect a cartridge which is not completely inserted into the holder 4 as shown in a phentom line in FIG. 3. Upon detection of such insufficient or incorrect insertion of the cartridge into the holder 4, an alarm may be made so that the operator may correct the insufficient or incorrect insertion.

Turning back to FIG. 1, there are shown two playback devices 7, 7 arranged in the Z direction. Each of the playback devices 7 and 7 includes a turn-table, a pick-up, etc., and having a similar construction to a playback device disclosed in the Japanese Patent Application No. 61-165792.

With the provision of two playback devices 7 and 7, a selected cartridge can be loaded onto one of the playback devices while another cartridge disc is played back in the other playback device so that many cartridge discs can be played back consecutively without any interruption.

The cartridge transfer mechanism will be explained hereinbelow which mechanism draws out a selected cartridge from the holder 4 and delivers the drawn cartridge upto either one of the playback devices 7 and 7'.

As seen from FIG. 1, a guide shaft 9 is provided which extends in the Z direction in the vicinity of the holder 4. On the guide shaft 9 is slidably mounted a base frame 10 which is driven by a base driven assembly including a teethed belt 11 wound on a sprocket 12 driven by a motor 13.

A pair of elongated guide shafts 15 and 16 are provided which respectively extend in the Z direction in substantially parallel to each other in the vicinity oif the guide shaft 9. These guide shafts 15 and 16 are not shown in FIG. 1 but shown in FIGS. 5(a) through 5(e). A counter weight 17 is slidably mounted at the side portions thereof on the guide shafts 15 and 16. On one of the side portions of the counter weight 17 are rotatably mounted two pairs of rollers 19 and 20 which respectively abut onto the guide shaft 16. Each pairs of the rollers includes two rollers which are rotatable about two different axes intersecting each other. On the other side of the counter weight 17 are rotatably mounted two pairs of rollers 21 and 22 which respectively abut onto the guide shaft 15. The rollers 21 and 22 are rotatable about two different axes directed to different directions intersecting each other and being remote from each other by a distance a as seen from FIG. 5(c) in the Z direction. As clearly seen from FIG. 5(e), the roller 22 is rotatably mounted on swing member 24 which is swingably mounted on the counter weight 17 by way of a pin 23 so that the swing member 24 is swingable in such a direction as shown by an arrow R. The direction R is contained in a plane parallel to the moving direction of the counter weight 17. A coil spring 25 is provided which urges the swing member 24 toward the guide shaft 15 so that the roller 22 is urged onto the guide shaft 15. Due to the reaction exerted onto the roller 22, the rollers 19 and 20 are urged onto the guide shaft 16. With the above arrangement, the counter with 17 is smoothly guided by the guide shafts 15 and 16. To the upper portion of the counter weight 17 are connected ends of two flexible wires 27. The flexible wires 7 extend by way of a pair of pulleys (not shown) in the vicinity of an upper portion of the guide shaft 9 upto the base 10 so that a balance in weight appears between the base 10 and the counter weight 17 with respect to the pulleys thereby to accomplish smooth up and down movements of the base frame 10.

Figure 5A:
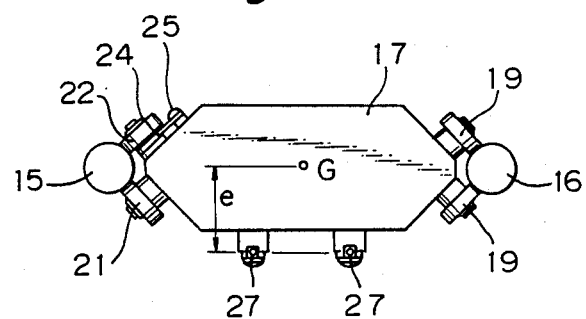
FIGS. 5(a) through 5(e) are plan, front, left-side, right-side and back views of a counter weight and its guide assembly which are parts of the cartridge disc player of FIG. 1.
Figure 5B:
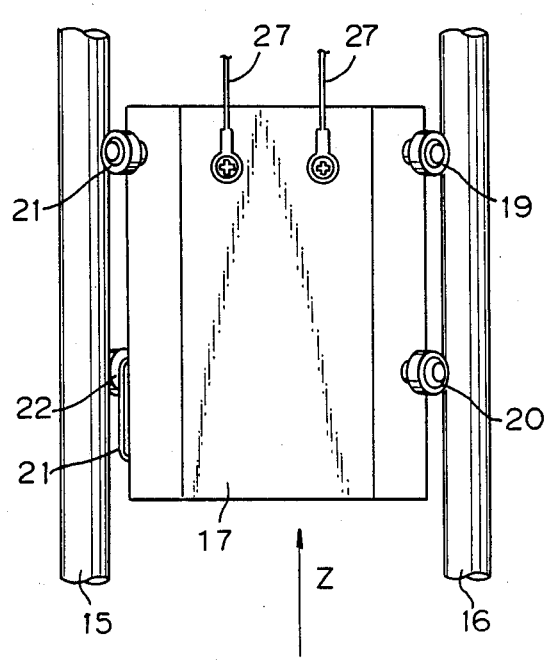
Figure 5C:
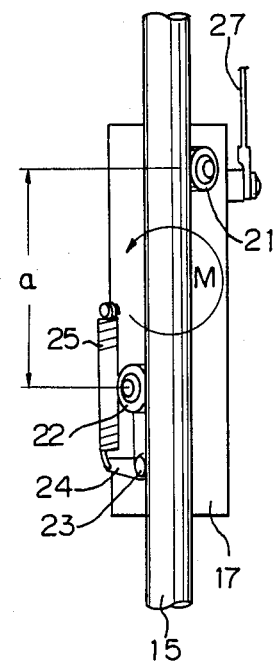
Figure 5D:
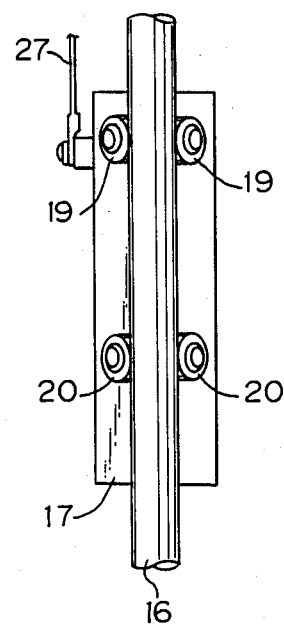
Figure 5E:
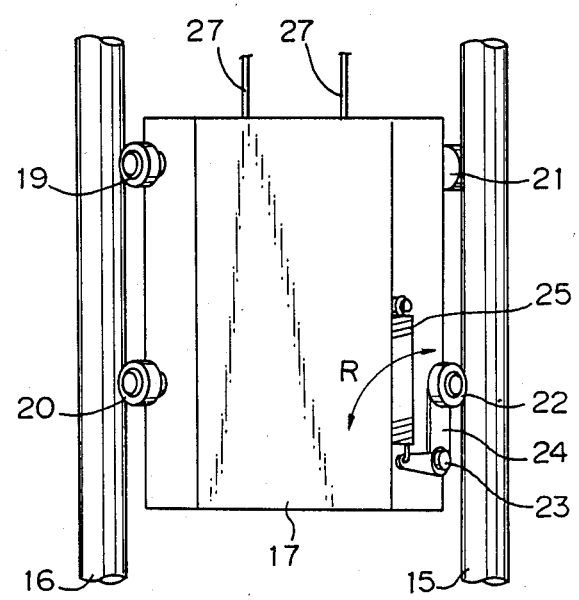

It is to be understood that a moment M is applied to the counter weight 17 as showin in FIG. 5(c) because the connection points of the wires 27 are deviated from the gravity center G of the counter weight 17. This moment M is overcome by a counter moment caused by the spring force of the coil spring 25 about the roller 21.

The counter moment is large enough to compensate for the moment M because of the distance a between the axes of the rollers 21 and 22, so that the counter weight 17 can move up and down smoothly.

Figure 6:
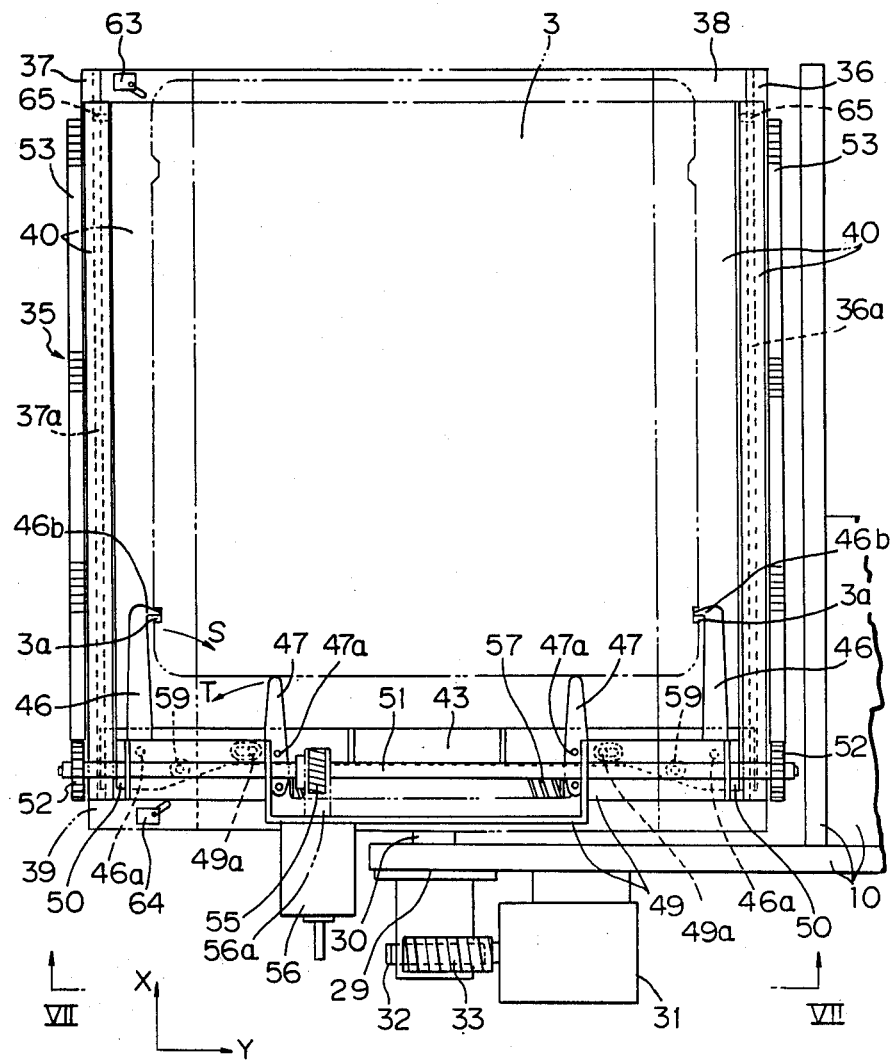
FIG. 6 is a plane view of a cartridge transfer mechanism of the cartridge disc player of FIG. 1.

As seen from FIGS. 1 and 6, a spindle 30 is rotatably mounted on the base 10 about a horizontal axis by way of a jouranal 29. The spindle 30 is enlarged at the rear end thereof on which a worn wheel 32 is mounted. With the worn wheel 32 is engaged a worn 33 which is driven by a motor 31 mounted on the base frame 10, so that the spindle 30 is driven by the rotation of the shaft of the motor 31.

Figure 7:
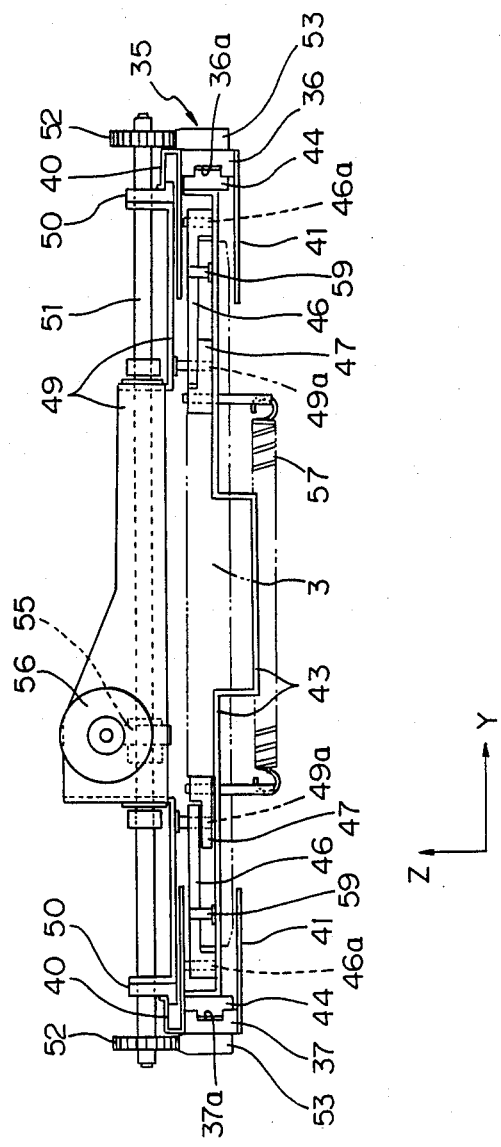
FIG. 7 is a front view of the cartridge transfer mechanism.
Figure 8:
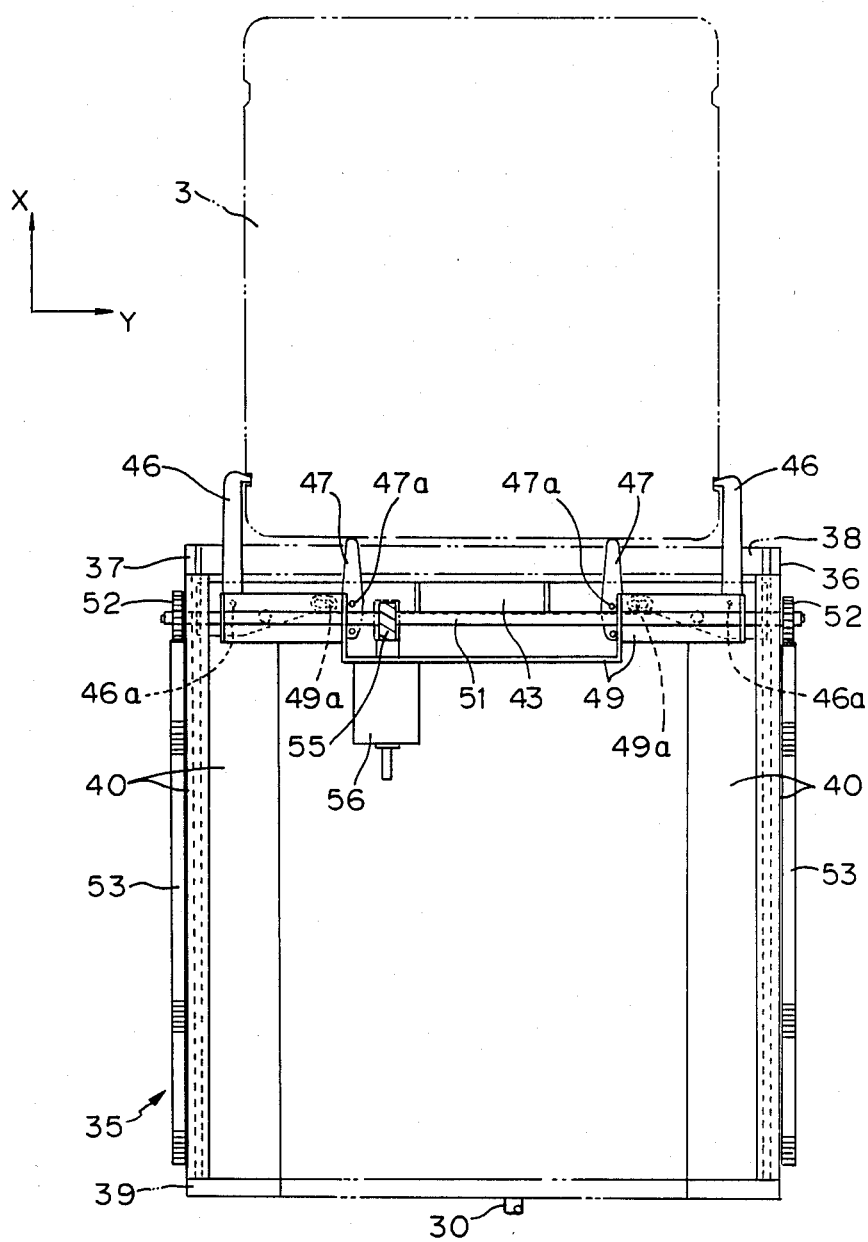

On the front end of the spindle 30 is mounted a rectangular rotary body 35 which is shown in detail in FIGS. 7 through 9 and rotatable in such direction as shown by an arrow Q in FIG. 1. The direction Q is contained in a plane parellel to the Z direction in which the cartridge discs are arranged in order to the holder 4. The rectangular rotary body 35 is constituted by two pairs of elongated members 36, 37 and 38, 39. Each pair of the members 36 through 39 are parallel to each other. The member 39 is connected at the central portion thereof onto the front end of the spindle 30. The side members 36 and 37 are respectively sandwiched by two pairs of upper and lower guide plates 40 and 41. In the side members 36 and 37 are respectively formed along the lateral direction thereof guide grooves 36a and 37a which respectively slidably receive side portions 44 of a movable chassis 43. The movable chassis 43 is therefore slidable on the rectangular rotary body 35 which is in turn rotatably mounted on the base frame 10. The movable chassis 43 is therefore movable with respect to the base frame 10 in the horizontal direction between a close position which is close to the holder 4 and a remote position which is remote from the holder 4.

As clearly seen from FIGS. 6, 8 and 9, a pair of catch arms 46 of generally L shaped are swingably mounted via pins 46a, 46a on the movable chassis 43. Since the pins 46a, 46a extends in the Z direction so that the catch arms 46 are swingable in the horizontal plane defined by the X and Y directions. The catch arms 46 are adapted to pinch the cartridge 3 at recesses 3a formed on the side surface of the cartridge 3 by way of hook ends 46b thereof. In the vicinity of the catch arms 46, push arms 47 are swingably mounted through pins 47a on hte movable chassis 43. The push arms 47 are swingable in a plane close to and parallel to the plane in which the catch arms 46 swing. The push arms 47 abut at the front end thereof onto the side surface of the cartridge 3 when they are in the home position thereof.

As seen from FIGS. 6 and 7, a pair of slide member 50 are slidably engaged with upper ends of the upper guide plate 40, 40 so that the slide members 50, 50 are slidable in the X direction. Between the slide members 50, 50 is supported a movable plate 49 which is then slidable in the X direction on the upper guide plates 40, 40. On the slide members 50, 50 and the movable plate 49 is rotatably mounted a spindle 51 which extend the Y direction and having at both ends thereof a pair of pinions 52 and 52. The pair of pinions 52 and 52 are meshed with racks 53, 53 respectively formed on the side members 36 and 37 of the rotary body 35. At an intermediate portion is mounted a worn wheel 55 which meshes with a worn fastened onto a rotary shaft of a motor 56 mounted on the movable plate 49.

When, with this arrangement, the motor 56 is energized, the pinions 52 rotates on the racks 53 so that the movable plate 49 moves in the X direction. On the movable plate 49 stand a pair of pins 49a, 49a which are spaced from each other in the Y direction. The pins 49a and 49a inserted into an elongated bores formed at one ends of the catch arms 46, 46 and push arms 47, 47. A tension spring 57 is bridged between the rear ends of the push arms 47, 47 whereby the push arms 47, 47 are so urged to swing oppositely that the front ends of the push arms 47 and 47 approach each other and therefore the hook ends 46b, 46b of the catch arms 46, 46 pinch the cartridge 3, as shown by arrows S and T in FIG. 6. This tension spring 57 and push arms 47, 47 functions as suppress means for suppressing the catch arms 46, 46 to swing in the opposite directions until the movable chassis 43 reaches the pinch position close to the holder 4. This construction for controlling the movement of the catch arms 46, 46 is preferably simple since the particular suppress means for suppressing the movement of the catch arms 46, 46 until the movable chassis 43 reaches the pinch position is constituted by a simple bias means of the tension spring 57 and the push arms 47, 47. A pair of stop pins 59 stand on the movable chassis 43 which respectively abut onto the catch arms 46, 46 so as to define the home positions of the catch arms 46, 46.

As being apparent from the above, the movable chassis 43 is driven to move with respect to the rotary body 35 and the body frame 10 by a movably chassis drive means which is constituted by the movable plate 49 slidably mounted via the slide members 50, 50 on the upper guide plate 40, the spindle 51 driven through the worn wheel 55 and worn 56a by the motor 56, and the rack and pinion assembly 51, 52 mounted on the rotary body 35. Thus, the movable chassis 43 is urged through the catch arms 46 and push arms 47 by the movable chassis drive means. The catch arms 46, push arms 47 tension spring 57 and pins 49a constitute a catch arm assembly which is driven directly by the movable chassis drive means.

As seen from FIG. 1, a plurality of detection levers 61 are provided which respectively correspond to the shelves 4a of the holder 4 so that each detection lever 61 engages with the side surface of a cartridge inserted into the corresponding shelf 4a thereby to actuate a detection mechanical switch (not shown).

As seen from FIG. 1, there is provided an address plate 62 in the vicinity of the path of the counter weight 17. The address plate includes a plurality of slits representing binary codes of absolute addresses corresponding to the respective position at which the base is to be placed for taking a selected cartridge from the holder 4.

A plurality of photo-couplers (not shown) are mounted on the base frame 10 so as to detect the absolute address at which the base frame 10 is places i. e. the catch arms 46, 46 are placed. The photo-couplers are arranged in the X direction and each of the photo-couplers includes photo-emissive and photo-receptive elements facing each other via the address plate 62.

As clearly seen from FIG. 6, there are provided with mechanical switches 63 and 64 on utmost edge portions of the rotary body 35 for defining the advanced and home positions of the movable plate 49. Furthermore, a pair of pins 65, 65 stand from the side members 36 and 37 at positions close to the side member 38. The pins 65, 65 define the pinch position of the movable chassis 43.

When, in operation, a cartridge to be played back is selected by the operator, the motor 13 rotates so as to move the base frame 10 to a position corresponding to the selected cartridge. Then, the motor 56 is energized so as to move the movable plate 49 from the home position toward the advanced position with respect to the rotary body 35. The movement of the movable plate 49 causes the movable chassis 43 to move toward the pinch position close to the holder 4. When the movable chassis 43 abuts onto the pins 65, 65 i. e. reaches the pinch position, the movable chassis 43 stops its movement but the movable plate 49 still continues to move toward its advanced position so that the catch arms 46, 46 and the push arms 47, 47 are urged by the pins 49a, 49a to swing against the bias force by the spring 57 thereby to take such positions as shown in FIG. 9. Under this condition, the hook ends 46b, 46b of the catch arms 46, 46 face the recesses 3a, 3a, respectively. Thereafter, the motor 56 is reversely energized so as to move the movable plate 48 toward the home position of the movable plate 49. Due to the return movement of the movable plate 49 causes the catch arms 46, 46 to return toward their home positions thereby catching the selected cartridge 3. When the movable plate 49 together with the moveable chassis 43 return the their home positions, the motor 13 starts again so as to move the base frame 10 carrying thereon the rotary body 35 up to either one of the playback device 7, 7. During the movement of the base frame 10 and the rotary body 35 toward the playback device, the motor 31 may be energized to rotate the rotary body 35 thereby to determined either one of the recording surfaces of the disc contained in the cartridge. Upon arrival of the rotary body 35 in front of the loading slot of either one of the playback devices 7, 7, the motor 56 is again energized to load the cartridge disc to the playback device. Upon completion of the loading of the cartridge disc through the loading slot onto the playback device, the motor 56 is reversely energized and then the motor 13 is again energized to position the body frame 10 and the rotary body 35 at a suitable position, for example, a position for catching a cartridge disc for the next playback operation.

It is now to be understood that the moveable chasis 43 is actuated via the catch arm assembly constituted by the catch arms 46, 46, push arsm 47, 47, tension spring 57 and pins 49a by means of movable chassis drive means. The movable chassis drive means is constituted by the movable plate 49 and drive means for moving the movable plate 49 with respect to the rotary body 35. Therefore, a single drive source, i. e., a motor 56 is commonly used for moving both of the movable chassis 43 and the catch arm assembly and therefore the cartridge disc player according to the subject invention is economical.

What is claimed is:

1. A cartridge disc player which comprises: a holder for holding a plurality of cartridges, each of said cartridges having at least one end, each cartridge containing therein a recording disc and having an access aperture through which a pickup can access to said disc; playback means for playing a cartridge disc loaded thereon; and cartridge transfer means for drawing a selected one of the cartridges from said holder, and for transferring and loading the selected cartridge to said playback means, said cartridge transfer means including:

a base carrier movable along said holder in a first direction in which said cartridges are arranged in order;

base carrier positioning means for positioning said base carrier at positions corresponding to a selected one of said cartridges and to said playback means;

a movable chassis mounted on said base carrier so as to be movable in a second direction substantially perpendicular to said first direction between a first position close to said holder and a second position remote from said holder;

a single catch arm assembly including at least one pair of catch arms swingably mounted on said movable chassis to swing in opposite directions to each other between a pinch position when said movable chassis is in said first position in which said catch arms are close to each other to pinch one of said cartridges at one end thereof and a release position when said movable chassis is in said second position in which said catch arms are remote from each other, and suppress means for suppressing the movement of said catch arms; and movable chassis drive means for driving said movable chassis with respect to said base carrier by urging said catch arm assembly in said second direction.

2. A cartridge disc player according to claim 1, in which said base carrier includes a base frame movable along said holder in said first direction, and a rotary body rotatably mounted on said base frame.

3. A cartridge disc player according to claim 1, in which said movable chassis drive means includes:
a movable plate movably mounted on said base assembly;
a movable plate drive mechanism mounted on said base carrier, for moving said movable plate with respect to said base carrier; and
engagement means for establishing an engagement between said movable plate and said catch arms thereby to urge said catch arms toward said release position when said movable plate is driven toward said holder.

4. A cartridge disc player according to claim 3, in which said suppress means includes: bias means connected between said catch arms, for urging said catch arms toward said pinch position.

5. A cartridge disc player according to claim 4, in which said bias means includes: a pair of push arms swingably mounted on said movable chassis and respectively linked with said catch arms so that said push arms are swingable together with the associated catch arms, and a tension spring connected between said push arms.

6. A cartridge disc player according to claim 5, in which each of said push arms has an elongated bore at one end thereof and each of said catch arms has an elongated bore at one end thereof, and said engagement means includes a pair of pins on said movable plate which engage with the respective elongated bores of the push arms and the catch arms respectively associated therewith for linking said catch arms with said push arms.

7. A cartridge disc player according to claim 3, in which said movable plate drive mechanism includes: a pair of racks mounted on said base carrier and being substantially parallel to each other along said second direction; a pair of pinions respectively meshing with said racks; and pinion drive means for driving said pinions.

8. A cartridge disc player according to claim 1, in which each of said cartridges is formed into a rectangular parallelepiped, and in which said holder is formed into a hollow rectangular parallelepiped defined by inner walls with one surface thereof being open and having inner projections inwardly projecting from the inner walls thereof and forming a plurality of shelves arranged in said first direction at a predetermined pitch, each of said projections extending throughout the inner walls of said holder along a plane substantially parallel to said second direction.

9. A cartridge disc player according to claim 1 which further comprises: cartridge detecting means for detecting that a cartridge is held in said holder.

10. a cartridge disc player according to claim 8, in which said playback means includes a pair of playback devices which can operate independently from each other, each of said playback devices having a loading inlet, and said playback devices being arranged in order along said first direction so that the loading inlets of the respective playback devices are substantially flush with the opened surface of said holder.

11. A cartridge disc player which comprises: a holder for holding a plurality of cartridges, said cartridges having at least one end, each cartridge containing therein a recording disc and having an access aperture through which a pickup can access to said disc; playback menas for playing a cartridge disc loaded thereon; and cartridge transfer means for drawing a selected one of the cartridges from said holder, and for transferring and loading the selected cartridge to said playback means, said cartridge transfer means including:
a base carrier movable along said holder in a first direction in which said cartridge are arranged in order;
base carrier positioning means for positioning said base carrier at positions corresponding to a selected one of said cartridges and to said playback means;
a movable chassis mounted on said base carrier so as to be movable in a second direction substantially perpendicular to said first direction between a first position close to said holder and a second position remote from said holder;
a catch arm assembly including at least one pair of catch arms swingably mounted on said movable chassis to swing in opposite directions to each other between a pinch position when said movable chassis is in said first position in which said catch arms are close to each other to pinch one of said cartridges at one end thereof and a release position when said movable chassis is in said second position in which said catch arms are remote from each other, and suppress means for suppressing the movement of said catch arms;
movable chassis drive means for driving said movable chassis with respect to said base carrier by urging said catch arm assembly in said second direction;
said base carrier including a base frame movable along said holder in said first direction, and a rotary body rotatably mounted on said base frame;
said movable chassis drive means including a movable plate movably mounted on said base assembly, a movable plate drive mechanism mounted on said base carrier for moving said movable plate with respect to said base carrier, and engagement means for establishing an engagement between said movable plate and said catch arms to thereby urge said catch arms toward said release position when said movable plate is driven toward said holder; and
said suppress meand including bias means connected between said catch arms for urging said catch arms toward said pinch position, said bias means including a pair of push arms swingably mounted on said movable chassis and respectively linked with said catch arms so that said push arms are swingable together with the associated catch arms, and a tension spring connected between said push arms.

12. A cartridge disc player according to claim 11, in which each of said push arms has an elongated bore at one end thereof and each of said catch arms has an elongated bore at one end thereof, and said engagement means includes a pair of pins on said movable plate which engages with the respective elongated bores of the push arms and the catch arms respectively associated therewith for linking said catch arms with said push arms.

13. A cartridge disc player which comprises: a holder for holding a plurality of cartridges, said cartridges having at least one end, each cartridge containing therein a recording disc and having an access aperture through which a pickup can access to said disc; playback means for playing a cartridge disc loaded thereon; and cartridge transfer means for drawing a selected one of the cartridges from said holder, and for transferring and loading the selected cartridge to said playback means, said cartridge transfer means including:
  a base carrier movable along said holder in a first direction in which said cartridges are arranged in order;
  base carrier positioning means for positioning said base carrier at positions corresponding to a selected one of said cartridges and to said playback means;
  a movable chassis mounted on said base carrier so as to be movable in a second direction substantially perpendicular to said first direction between a first position close to said holder and a second position remote from said holder;
  a catch arm assembly including at least one pair of catch arms swingably mounted on said movable chassis to swing in opposite directions to each other between a pinch position when said movable chassis is in said first position in which said catch arms are close to each other to pinch one of said cartridges at one end thereof and a release position when said movable chassis is in said second position in which said catch arms are remote from each other, and suppress means for suppressing the movement of said catch arms;
  movable chassis drive means for driving said movable chassis with respect to said base carrier by urging said catch arm assembly in said second direction;
  said base carrier including a base frame movable along said holder in said first direction, and a rotary body rotatably mounted on said base frame;
  said movable chassis drive means including a movable plate movably mounted on said base assembly, a movable platge drive mechanism mounted on said base carrier for moving said movable plate with respect to said base carrier, and engagement means for establishing an engagement between said movable plate and said catch arms thereby to urge said catch arms toward said release position when said movable plate is driven toward said holder; and
  said movable plate drive mechanism including a pair of racks mounted on said base carrier and being substantially parallel to each other along said second direction, a pair of pinions respectively meshing with said racks, and pinion drive means for driving said pinions.

* * * * *